United States Patent [19]

Higgins

[11] Patent Number: 4,630,389
[45] Date of Patent: Dec. 23, 1986

[54] FISH LURE

[76] Inventor: Michael Higgins, P.O. Box 95-1706, Stuart, Fla. 33495-1706

[21] Appl. No.: 726,098

[22] Filed: Apr. 23, 1985

[51] Int. Cl.$^4$ .............................................. A01K 85/00
[52] U.S. Cl. ................... 43/42.22; 43/42.33; 43/42.35
[58] Field of Search ............... 43/42, 42.06, 42.22, 43/42.23, 42.31, 42.33, 42.35

[56] References Cited

U.S. PATENT DOCUMENTS

| | | | |
|---|---|---|---|
| 1,708,825 | 4/1929 | Barclay . | |
| 1,792,989 | 2/1931 | La Gue | 43/42.31 |
| 2,538,459 | 1/1951 | Kasmeyer | 43/42.06 |
| 2,600,437 | 6/1952 | Siepe | 43/42.06 |
| 2,737,750 | 3/1956 | Pierce | 43/42.33 |
| 2,817,180 | 12/1957 | Thomas | 43/42.06 |
| 3,105,317 | 10/1963 | Fox | 43/42.06 |
| 3,269,050 | 8/1966 | Garwood | 43/42.35 |
| 3,705,465 | 12/1972 | Charney | 43/42.06 |
| 3,757,455 | 9/1973 | Strader | 43/42.14 |
| 3,905,147 | 9/1975 | Snipes | 43/17.1 |
| 3,914,895 | 10/1975 | Mize | 43/42.06 |
| 3,971,152 | 7/1976 | Husson | 43/42.06 |
| 3,988,851 | 11/1976 | Sacharnoski | 43/42.31 |
| 4,003,574 | 1/1977 | MacDonald et al. | 273/65 |
| 4,098,017 | 7/1978 | Hall | 43/42.06 |
| 4,203,246 | 5/1980 | Sacharnoski | 43/42.31 |
| 4,231,179 | 11/1980 | Hilleslano | 43/42.06 |
| 4,339,138 | 7/1982 | DiManno | 273/428 |
| 4,345,399 | 8/1982 | Guzik | 43/42.06 |
| 4,438,583 | 3/1984 | Sullivan | 43/42.06 |
| 4,453,335 | 6/1984 | Smith | 43/42.31 |

Primary Examiner—M. Jordan
Attorney, Agent, or Firm—Steele, Gould & Fried

[57] ABSTRACT

A fish lure that alternately dives and surfaces has a hollow body through which water flows as the lure is drawn through water on a line, and an air catching means such as a skirt on the trailing end of the body. The trailing end can be made of a material relatively heavier than water and can be flared to produce an air-retardation low-pressure area at the trailing end. When the air catching means holds water only, the lure is directed upwards to the surface, causing ingestion of air. The ingested air trapped in the air catching means offsets the trailing end weight and causes the lure to tilt downwards temporarily, until the air is lost. The alternating effect may be enhanced by movable-body noisemakers attached within the hollow body and having weighted balls that roll fore and aft as the lure tilts. The variations in lure depth, bubble emission and in emitted sounds due to variations in tilt and air content make the lure especially interesting to fish.

7 Claims, 7 Drawing Figures

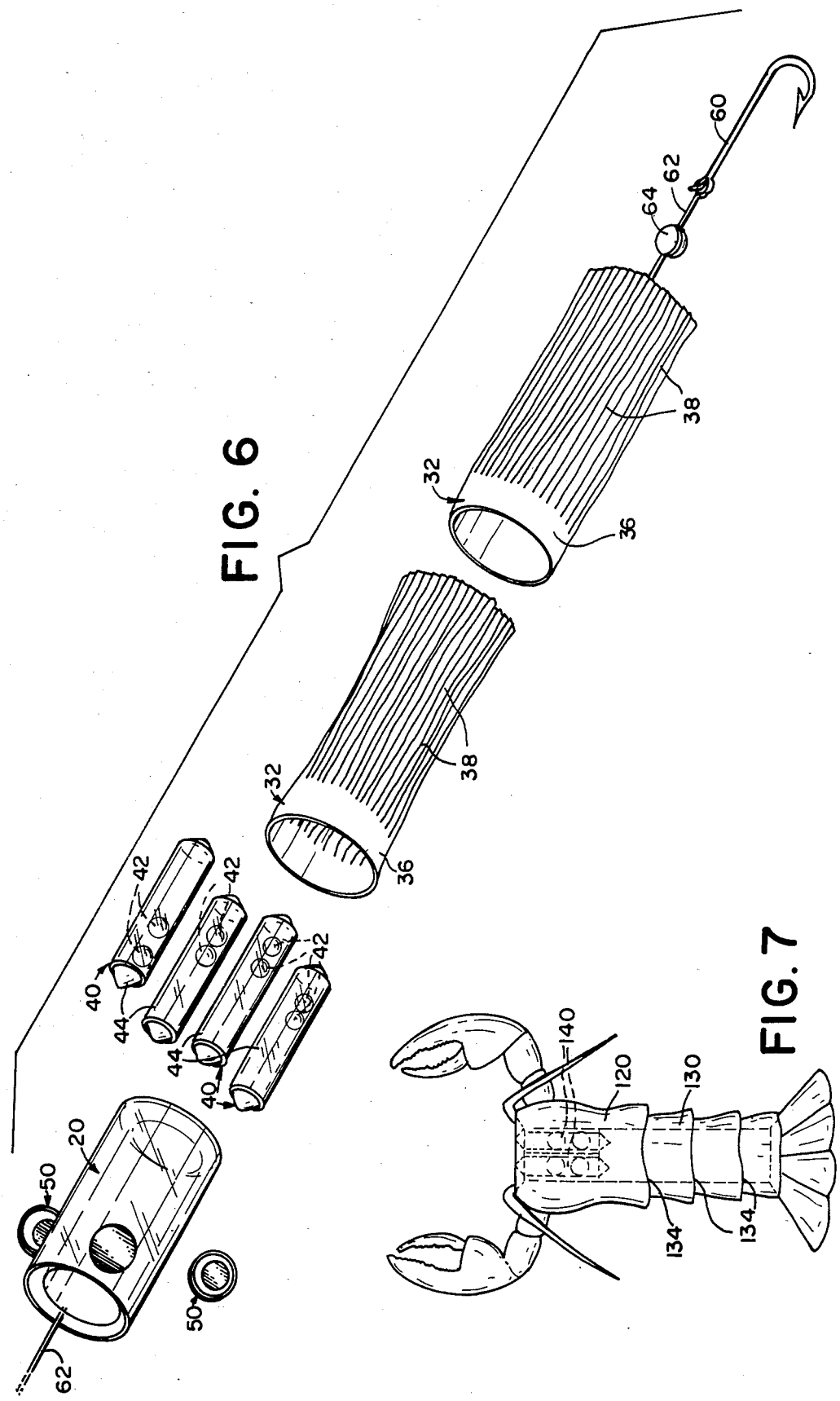

FISH LURE

BACKGROUND OF THE INVENTION

1. Field of the Invention

This invention relates to the field of fish lures to be drawn through water using a line, and in particular to a fish lure having periodic variations in lure characteristics caused by ingestion of air.

2. Description of the Prior Art

Various fish lures are known in the art to have some form of longitudinal opening through which water passes as the lure is drawn through the water in a trolling motion. An example of such a device is U.S. Pat. No. 3,705,465-Charney, in which a clear plastic material of a generally tubular shape is provided with external eyes and various devices located inside the hollow body along the flow path. In one embodiment, Charney's lure includes a sealed hollow body having a so-called "knocker" ball that rolls to and fro to audibly attract fish.

It is known to mount flow-diverting mechanisms along the flow path in a hollow lure body, in order to impart a wiggling motion to the lure similar to the swimming motion of a bait fish. Examples of these devices are shown in U.S. Pat. Nos. 1,708,825-Barclay, 2,538,459-Kasmeyer and 2,817,180-Thomas. In Thomas, the diverter is designed to not only wiggle the lure, but to displace the lure transversely from the axis of the line drawing the lure through the water.

Freely-movable diverter mechanisms are also known, some being mounted within the lure and some being external thereto. In U.S. Pat. No. 4,231,179-Hillesand, for example, a tail-wiggling artificial worm is affixed to a line behind a plug having a longitudinal opening, the worm causing the lure to wiggle when trolled. Similarly, U.S. Pat. No. 2,600,437-Siepe teaches a hingeable deflector mounted at the tail of a hollow body. These devices are useful for causing a lure to wiggle or even to make small scale diversions from the axis of the line on which they are drawn. The devices are not effective, however, for making substantial and long-lived changes in the lure's operating characteristics, as might reflect the natural action of a bait fish alternately coming to the surface and diving. Accordingly, the small scale or wiggling diversions are less realistic and less interesting to game fish than they might be. The prior art devices are also somewhat complicated in their structure, increasing the cost of manufacture.

Knocker ball lures, that is lures having movable elements adapted to impact on internal surfaces to cause an attractive noise, are known in various forms. In U.S. Pat. No. 4,203,246 and 3,988,851, both to Sacharnoski, Sr., a glass tube having a plurality of captive free rolling metal balls can be mounted inside a lure to make an attractive noise. The tube and balls according to Sacharnoski can be mounted longitudinally or transversely in the lure, and it appears that the random motions of the lure in the water are relied upon to tilt the tube and cause the balls to roll against the ends of the tube and against one another. In U.S. Pat. No. 4,453,335-Smith, a knocker ball is held captive between pins, and adapted to move transversely rather than longitudinally, in response to oscillations in fluid flow through a hollow lure. In U.S. Pat. Nos. 3,757,455-Strader, propellers are employed to spin a hollow receptacle for a number of noisemaking balls.

Although the foregoing knocker ball devices are effective in making noise, the noise is essentially random, that is, not corresponding to any change in direction of the lure. Inasmuch as the lures operate at a predetermined depth under water, the tonal qualities of the noise remain constant. The fact that the moveable balls tend to change the weight balance of the lure is largely ignored in the prior art teachings and no attempt is made to periodically change tonal qualities, for example by periodic ingestion of air.

According to the invention, a lure is provided that will alternatively dive and surface in a manner that permits a substantial and long-lived change in the lure's running depth. This is provided by means of a stern- or tail-heavy lure that surfaces to ingest air into a longitudinal passage, escape of the air being retarded at a trailing end of the lure. With air trapped at the trailing end, the lure becomes nose-heavy and dives. When the ingested air has escaped, the lure becomes tail-heavy and rises. The alternating balance effect of air bubbles ingested in this manner is made more pronounced by noise-making knocker balls that are movable along the longitudinal axis of the lure, displacement of the knocker balls tending to make the lure even more nose heavy when diving and even more tail heavy when surfacing. The intermittent ingestion of air bubbles also changes the noise emitted by the lure in the water due to an effective change in lure mass and/or resonant characteristics. The lure is relatively uncomplicated in construction and therefore provides an effective solution to many of the problems in the art.

SUMMARY OF THE INVENTION

It is an object of the invention to provide a lure that when trolled will automatically vary in its running depth to a substantial degree.

It is also an object of the invention to imitate the natural motions of bait fish as well as to provide a lure having attractive visual and audible features.

It is another object of the invention to develop a lure that intermittently ingests air as a means of temporarily varying its operating characteristics.

It is a further object of the invention to produce a lure that retards air bubbles at the trailing end using a pressure-varying flow contour.

It is yet another object of the invention to provide an unbalanced weight lure for providing variations in operating characteristics that will be interesting to fish.

It is still another object of the invention to vary the audible characteristics of a lure having an internal noise generation means by intermittently ingesting air, and to vary the visual characteristics by intermittent release of a stream of bubbles over a range of lure depths.

These and other objects are accomplished by a fish lure for tracing an up and down alternating motion having a hollow body through which water flows as the lure is drawn along, and an air catching means of a material relatively heavier than water and including means to retard the passage of bubbles received through the hollow body. The air catching means can include a flaring cross-section producing low pressure adjacent the trailing end, or other bubble-holding structure. A heavier air catching means can be attached, which tilts the lure upwards to surface, causing ingestion of air. The ingested air trapped in the air catching means causes the lure to tilt downwards temporarily, until the air is lost. The alternating effect may be enhanced by movable-body noisemakers attached to the hollow body and having weighed balls that roll fore and aft as the lure tilts.

BRIEF DESCRIPTION OF THE DRAWINGS

There are shown in the drawings the embodiments which are presently preferred. It should be understood, however, that the invention is not limited to the precise arrangements and instrumentalities shown in the drawings, wherein:

FIG. 6 is an exploded perspective view of the device of FIGS. 1–5.

FIG. 7 is a plan view illustrating an alternative embodiment.

DETAILED DESCRIPTION OF THE PREFERRED EMBODIMENT

Figure 1:
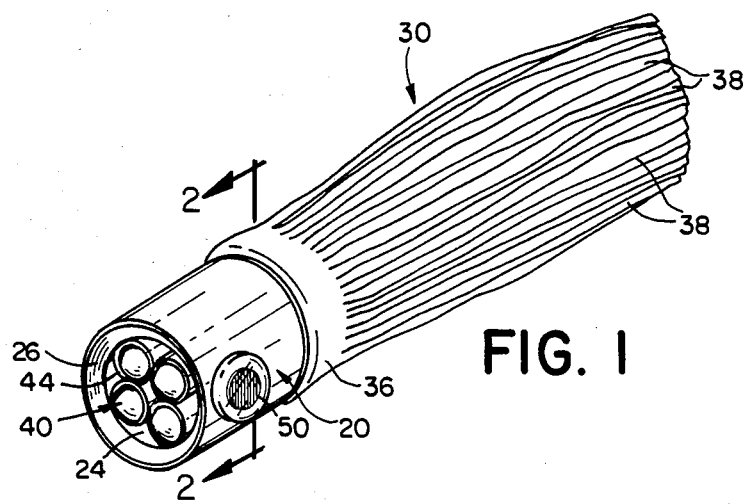
FIG. 1 is a perspective view of a preferred embodiment of the invention.

As shown in the drawings, the lure of the invention can be conveniently embodied in the form of a squid, or in other forms. The invention can also be embodied in a range of sizes to suit the particular conditions. Generally, the lure is to be affixed to a fishing line together with a hook, and drawn by the line, i.e. trolled, from a moving boat or by being cast and reeled back to the fisherman. Along the way, the lure is expected to exhibit visual, audible or other features that will be sufficiently attractive, for example similar to a bait fish or aggravating to a game fish, to move the game fish to strike the lure.

With reference to FIG. 1, a preferred lure has a hollow body 20, for example a plastic tube, which will be the head or leading end of the lure as it is drawn through the water. At the trailing end of the lure, an air catching means 30 is provided. The particular forms and dimensions are chosen to reflect certain characteristics of a bait fish. For example, the embodiment of FIG. 1 can be considered to resemble a squid having a generally-tubular body corresponding to hollow body 20 and a plurality of trailing tentacles corresponding to strips 38 of air-catching means 30.

Figure 2:
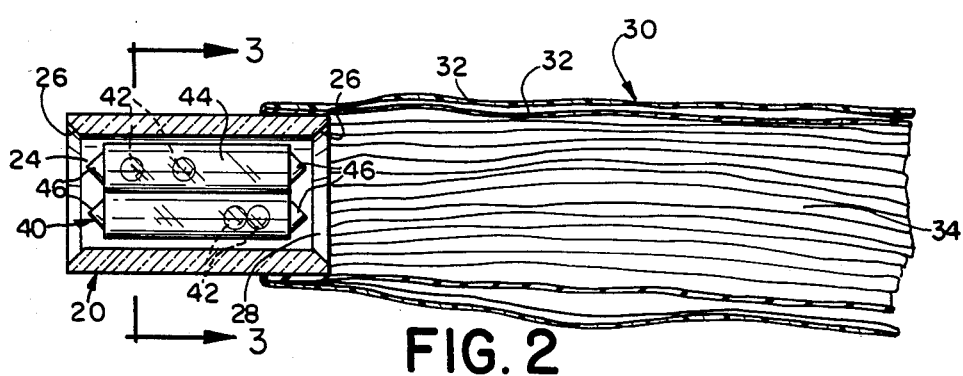
FIG. 2 is a section view taken along lines 2—2 in FIG. 1.

The leading end of hollow body 20 has a flared inlet portin 24, defined by bevel 26 around the inside leading edge. The outlet portion 28 of body 20 may also be provided with a bevel 26, as shown in FIG. 2. The provision of leading and trailing bevels causes the hollow body to be dynamically stable and less resistant to being drawn through the fluid medium. The leading flared portion 24 is likewise more effective to ingest air when the lure surfaces than a blunt edge.

Figure 3:
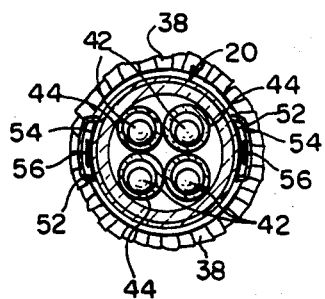
FIG. 3 is a section view taken along lines 3—3 in FIG. 2.

A noisemaker 40, for example including a plurality of noisemaker tubes 44, is mounted within the hollow of hollow body 20. As shown in FIG. 3, sufficient space is left between the individual receptacle tubes 44 to permit water and air bubbles to flow along the longitudinal flow path defined by the hollow of tube 20, and to receive a line (not shown), for example, passing through the lure along the axis of tube 20 to a hook at the trailing end. Individual receptacle tubes 44 are preferably hollow plastic tubes having conically shaped sealed ends 46. Movable noisemaker balls 42 are captive in receptacle tubes 44, and roll freely from end to end within the tube as the lure tilts nose up and nose down. Bodies 42 may be, for example, shiny metal balls such as ball bearings or shot visible through the lure. Individual tubes 44 are preferably glued together and also to the inner walls of tube 20.

Structures 50, resembling eyes, are attached to the outside surfaces of tube 20. The eyes 50 have clear plastic covers 52, affixed to body 20 around their peripheral edges, and holding background opaque white cover 54 and movable opaque black pupil 56 therein. The eyes are similar to the well known eyes used for stuffed toy animals, teddy bears and the like.

An air catching means is provided on the trailing or downstream end of body 20. Preferably, the cross-sectional area of the axial opening in body 20 reduces inwardly at the leading end, and increases outwardly at the trailing end. This produces a low pressure turbulent area at the trailing end that retards passage of bubbles.

Air catching means 30, downstream of body 20 along the flow path of water through the lure, is preferably formed to include a plurality of individual skirt members 32. These are affixed coaxially on the trailing end of body 20, as shown in FIG. 2, and can be in contrasting colors, for example, the inner skirt being light colored and the outer skirt dark colored. Each of the individual skirts 32 is a generally-tubular flexible member, for example, soft plastic or rubber, slit along the rear to form a plurality of strips 38. The un-slited front portion 36 is stretched over the trailing edge of body 20 and glued. Skirts 32 are preferably heavier than the volume of water they displace (i.e., they are more dense than water and sink rather than float).

The lure is operated by running a line 62 though the body of the lure and affixing a hook 60 on the opposite end. Line 62 may be knotted on the trailing end of body 20, such that hook 60 is spaced from body 20 and resides in the individual strips of air catching skirt 30. The alternating actions traced by the lure when placed below the surface 70 of water, are shown in FIGS. 4 and 5.

Figure 4:
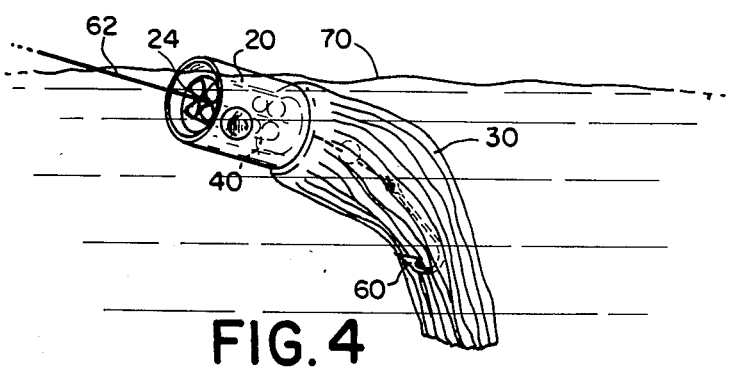
FIG. 4 is a schematic perspective view illustrating a first mode of operation of the invention.
Figure 5:
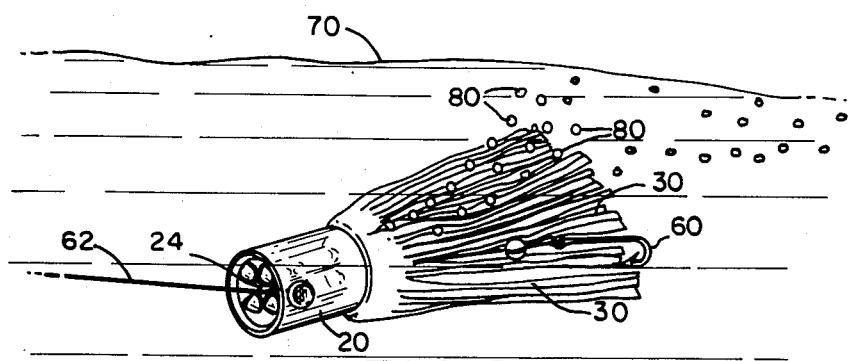
FIG. 5 is a schematic perspective view illustrating the alternate mode of operation.

In FIG. 4, skirt 30, which tends to sink, tends to pull the trailing end of the lure down. Hollow body 20, which is fluid-dynamically shaped by virtue of its hollow tubular shape with leading and trailing bevels, then traces a path upwards towards surface 70 as it is drawn along by line 62. While the lure is rising towards the surface, the tilt of hollow body 20 is, of course, also assumed by individual receptacle tubes 44 of noisemaker 40. Therefore, the movable balls 42 roll to the trailing end of body 20 and increase the extent to which the rear portion of the lure is heavier than the nose. The balls increase the angle at which the lure rises to the surface. Eventually, the leading edge of body 20, that is flaring inlet 24, breaks the surface 70 of the water and a quantity of air is ingested into body 20.

The ingested air-water mixture is compressed due to the bullet-shape of the ends of the tubes 46, and is carried along the flow path of hollow body 20 to the trailing edge of body 20. This air-water mixture then expands due to the bullet-shaped trailing ends of tubes 46, causing a negative pressure inside the trailing edge of body 20. The air is retarded at the trailing edge of body 20 by the negative pressure and also by skirts 32 due to the obstruction adjacent the trailing end of the lure, i.e., skirts 32. The retained air tends to rise, causing the lure to become nose-heavy and to dive as shown in FIG. 5.

Air bubbles 80, which were ingested when the lure surfaced, are retarded by the foraminous air-catching member 30 at the trailing end of body 20, for example dual slit skirt 32. Even minimal tilting of hollow body 20 caused by air bubbles 80 lifting skirts 30 allows the movable balls in noisemaker 40 to roll to the nose of the lure, accentuating the imbalance and increasing the angle of dive. Therefore, the lure will alternately surface and sink as it is drawn along.

The skirts 32 eventually release the air bubbles ingested. Due to retarding passage of the bubbles one way or another, a long stream of bubbles is released over time as the lure is drawn along. The long stream is much more effective at drawing the attention of game fish than a simple submerged lure because the bubbles provide an effectively larger visual target than the lure alone.

The particular weights and dimensions that should be observed will depend to some extent on the overall size of the lure, and the speed with which it is to be drawn through the water. For the most part, the size and material for body 20 and skirt or other air-catching member 30 are chosen such that even without unbalanced noisemaker balls 42, the tail portion of the lure will sink below the nose portion when placed in water. The unbalance between the skirt and nose can be pronounced for a quick alternating movement, or only slight for a slowly-varying movement. The skirt member 30 should be sufficiently long to temporarily hold a reasonably large proportion of the passing air. This is preferably accomplished using elongated split skirts 32, the individual strips 38 tending to wave around in the flow path, not only holding bubbles 80 between the individual strips, but also blocking part of the flow path along the axis of the lure. Other air-catching members are possible, for example plural rigid tubes or radially-aligned receptacles that will trap and hold air bubbles until the lure reaches a certain angle of dive, whereupon the bubbles are freed.

In connection with a polycarbonate body 20 of about 2 inches length, skirts 32 may be soft vinyl or a similar plastic or rubber material, for example, about 5–6 inches in length. The individual strips are cut to about one eighth inch width. Feathers or thread enclosures may be used as well to pass water and at the same time temporarily retain bubbles.

The respective parts are shown in exploded perspective view in FIG. 6. Noisemaker receptacle tubes 44 with their captive balls 42 are glued or welded to one another and to the internal surfaces of tube 20. Similarly, eye structures 50 are glued or welded on the outer surfaces, and skirts 32 are glued over one another at the trailing edge of the body. In use, the user passes line 62 through the lure, preferably along its axis, tying a knot or affixing an enlargement such as split shot 64 on the opposite side. The enlargement presses forward on the rear portion of the lure, for example, against the back of receptacle tubes 44, forcing the lure through the water as the line is pulled. Hook 60 which is spaced back from abutment 64 is hidden within strips 38 of skirts 32. Split shot 64 or the like may be used as a means to balance the overall lure such that it is slightly tail-heavy even if the air-catching means is buoyant, e.g. in the case of feathers.

The noisemaker tubes 44 are preferably plastic tubes having streamlined rounded ends or conical ends. Ends 46 may be formed, for example by melting the ends of plastic tubing, the tubing naturally collapsing into a conical shape. If desired, the melted ends can be molded by pressing them against a forming member. It is also possible to form the ends 46 separately and to glue or weld them onto ends of right-cylindrical-shaped tubes. Ends 46 may have hemispherical shapes dimensioned precisely complementary to balls 42, whereby the balls impact solidly against the hemispherical ends for a sharp staccato clacking noise. According to the invention, the clacking noise (as well as the sound of balls 42 rolling in tubes 44) is modified by the different resonance of the lure when dry, fully submerged and submerged but holding bubbles. Each of these conditions produces a slightly different resonances and a distinguishable sound.

The lure need not be shaped only in the external appearance of a squid or vertebrate bait fish. As shown in FIG. 7, other shapes are also appropriate. For fresh water use, a crayfish shape can be made for hollow body 120, noisemaker 140 being mounted in the hollow as before. Air-catching trailing member 130, for example resembling a crayfish tail and having a closed rear portion and spaced slots 134 resembling the spaces between crayfish segments, tend to retard the release of air bubbles on the downstream end of the lure.

The lure of the invention is particularly useful in open trolling situations in which the fisherman is not required to execute manual variations in the way the lure is drawn in, such as by twitching a fishing rod. Therefore, the lure is appropriate for trolling behind a boat. In fresh water use, the lure is believed to be quite appealing to the fish in that it traces relatively-natural movements of surfacing and diving, as naturally executed by fish rising for surface food or for a bubble of air in warm, oxygen-poor waters.

Additional variations will now be apparent to person of ordinary skill being informed of the invention. Reference should be made to the appended claims rather than the foregoing specification as indicating the true scope of the invention.

What is claimed is:

1. A fish lure, comprising:
   a tube open at each end forming a body having leading and trailing ends designed to define a streamlined body;
   a plurality of sealed tubes mounted within the body, the sealed tubes having leading and trailing ends, the sealed tubes being aligned parallel to a longitudinal axis of the body; and,
   a plurality of elements movably captive in the sealed tubes and a flexible skirt attached to the trailing end to the body.

2. The lure of claim 1, wherein the sealed tubes are closely stacked within the body, spaces between the sealed tubes allowing passage of water and receiving a line for drawing the lure along.

3. The lure of claim 17, wherein the skirt comprises a slit flexible tube.

4. The lure of claim 1, further comprising eyes affixed on external surfaces of the hollow body.

5. The lure of claim 1, wherein the elements are shiny metal balls visible through the walls of the hollow body.

6. The lure of claim 1, wherein the sealed tubes have rounded ends.

7. The lure of claim 1, wherein the sealed tubes have conical ends.

* * * * *